(12) United States Patent
Ghosh et al.

(10) Patent No.: US 8,260,962 B1
(45) Date of Patent: Sep. 4, 2012

(54) DONOR/BORROWER INCIDENT NOTIFICATION FOR DAEMONS

(75) Inventors: Kaushik Ghosh, Sunnyvale, CA (US); Bharani Chadalavada, San Jose, CA (US); Vinay Nallamothu, Andra Pradesh (IN)

(73) Assignee: Juniper Networks, Inc., Sunnyvale, CA (US)

( * ) Notice: Subject to any disclaimer, the term of this patent is extended or adjusted under 35 U.S.C. 154(b) by 489 days.

(21) Appl. No.: 12/264,638

(22) Filed: Nov. 4, 2008

(51) Int. Cl.
*G06F 15/16* (2006.01)
*H04L 12/28* (2006.01)

(52) U.S. Cl. .................. 709/245; 709/203; 370/389
(58) Field of Classification Search ............ 709/245
See application file for complete search history.

(56) References Cited

U.S. PATENT DOCUMENTS

| | | | |
|---|---|---|---|
| 7,007,080 B2 * | 2/2006 | Wilson ............ | 709/221 |
| 2002/0112076 A1 * | 8/2002 | Rueda et al. ......... | 709/245 |
| 2002/0150094 A1 * | 10/2002 | Cheng et al. ......... | 370/389 |
| 2004/0122976 A1 * | 6/2004 | Dutta et al. .......... | 709/245 |
| 2004/0193653 A1 * | 9/2004 | Howard et al. ....... | 707/200 |
| 2005/0251577 A1 * | 11/2005 | Guo et al. ........... | 709/230 |
| 2005/0256958 A1 * | 11/2005 | Wilson .............. | 709/227 |
| 2006/0268871 A1 * | 11/2006 | Van Zijst ........... | 370/390 |
| 2007/0153741 A1 * | 7/2007 | Blanchette et al. .... | 370/331 |
| 2010/0235433 A1 * | 9/2010 | Ansari et al. ........ | 709/203 |
| 2010/0241748 A1 * | 9/2010 | Ansari et al. ........ | 709/225 |

* cited by examiner

*Primary Examiner* — Peling Shaw
*Assistant Examiner* — Joiya M Cloud
(74) *Attorney, Agent, or Firm* — Harrity & Harrity, LLP

(57) ABSTRACT

A device may include a donor to maintain a pool of addresses; a group of borrowers to obtain addresses from the donor; a daemon that has registered an interest in one or more borrowers in the group of borrowers; and a library to maintain first relationships between donors and borrowers that have obtained addresses from the donors, maintain second relationships between daemons and borrowers in which the daemons have registered an interest, receive a notification regarding an incident associated with the donor, identify, in response to the notification, the group of borrowers based on the first relationships, determine that the daemon has registered an interest in the one or more borrowers in the group of borrowers based on the second relationships, and output, to the daemon, a notification regarding the incident associated with the donor.

23 Claims, 10 Drawing Sheets

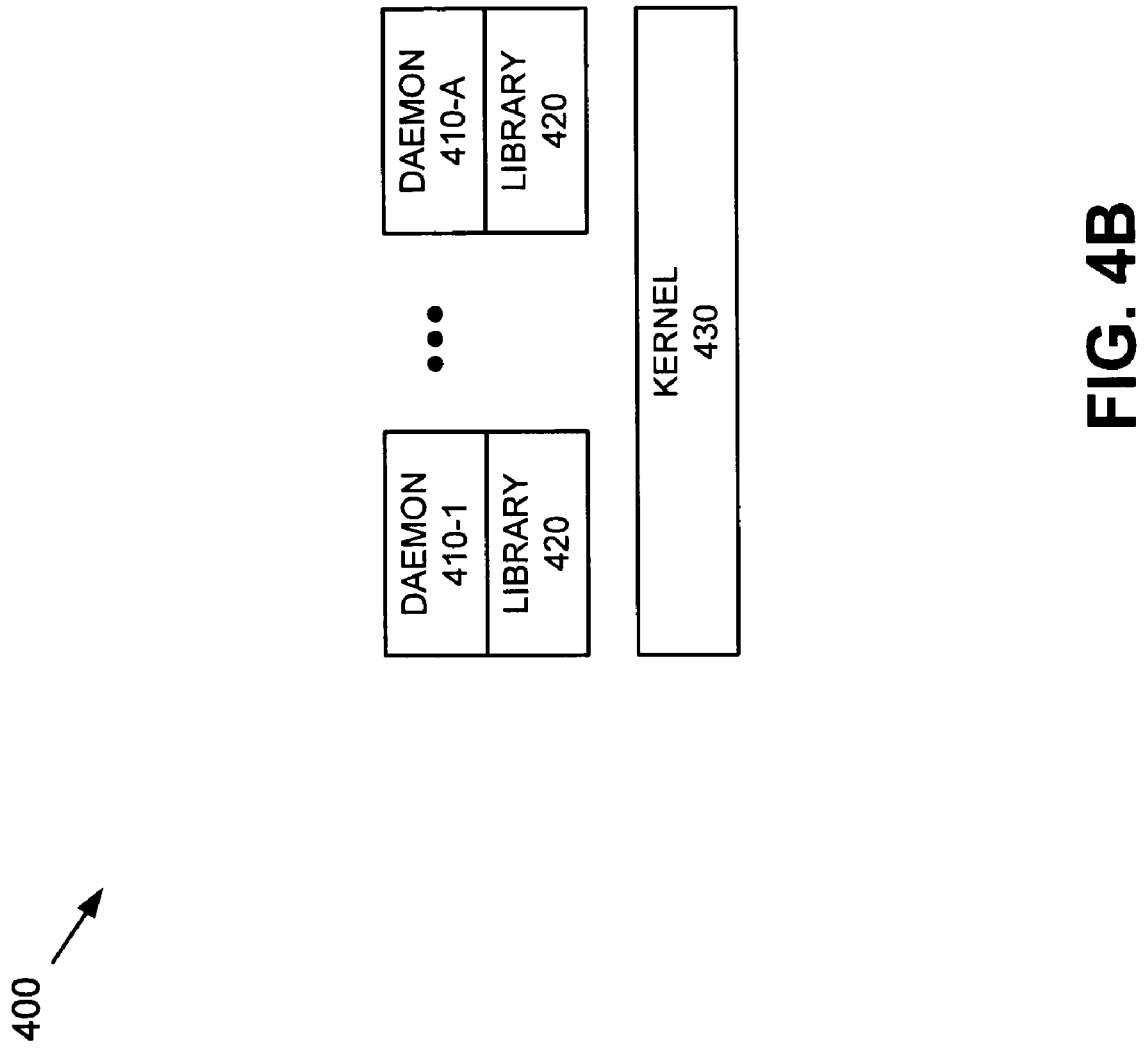

DONOR/BORROWER INCIDENT NOTIFICATION FOR DAEMONS

BACKGROUND

In network routers, there could be a large number of physical or logical network interfaces. Assigning a unique Internet Protocol (IP) address to each interface is cumbersome and consumes a large number of network addresses. To alleviate these issues, only a small group of the interfaces (called donors) may be assigned a unique network address and all other interfaces (called borrowers) may borrow address(es) from the group of interfaces.

Network applications/programs need to be aware of each interface address and be sensitive to changes in an interface address. To get notified of changes of an interface address, applications/programs may register, with a kernel, for interface address change event notification. There could be a large number of borrowers for each donor. As a result, any change in an address of the donor has to be notified to the applications/programs for each borrower, which results in the kernel generating a large number of event notification messages. This leads to reduced system performance and responsiveness, as each program will have to spend a significant amount of resources to process these events.

SUMMARY

According to one implementation, a device may include a donor to maintain a pool of addresses; a group of borrowers to obtain addresses from the donor; a daemon that has registered an interest in one or more borrowers in the group of borrowers; and a library. The library may maintain first relationships between donors and borrowers that have obtained addresses from the donors, one of the first relationships corresponding to the donor and the group of borrowers; and maintain second relationships between daemons and borrowers in which the daemons have registered an interest, one of the second relationships corresponding to the daemon and the one or more borrowers. The library may receive a notification regarding an incident associated with the donor, identify, in response to the notification, the group of borrowers based on the first relationships, determine that the daemon has registered an interest in the one or more borrowers in the group of borrowers based on the second relationships, and output, to the daemon, a notification regarding the incident associated with the donor.

According to another implementation, an automated method may include storing first mappings between donors and borrowers that have obtained addresses from the donors; storing second mappings between daemons and the borrowers in which the daemons have registered an interest; receiving a first notification regarding an incident associated with one of the donors; identifying, in response to the first notification, one or more of the borrowers based on the first mappings; identifying one or more of the daemons that have registered an interest in the one or more borrowers based on the second mappings; and sending, only to each of the identified one or more of the daemons, a second notification regarding the incident associated with the one of the donors.

According to yet another implementation, a device may include means for providing a number of donors; means for providing a number of borrowers that have obtained addresses from the donors; means for providing a number of daemons that have registered an interest in the borrowers; means for receiving a first notification regarding an incident associated with one of the donors; means for identifying, in response to the first notification, one or more of the borrowers that have borrowed addresses from the one of the donors; means for identifying one or more of the daemons that have registered an interest in the one or more of the borrowers; and means for transmitting, to each of the identified one or more of the daemons, a second notification regarding the incident associated with the one of the donors.

According to a further implementation, a device may include a daemon; a number of donors; a number of borrowers that may obtain addresses from the donors; and a kernel that may output a notification regarding an incident involving a particular one of the donors. The device may also include a controller that may receive, from the kernel, the notification regarding the incident involving the particular donor, identify, in response to the notification, one or more of the borrowers that have borrowed addresses from the particular donor, determine that the daemon has registered an interest in one of the one or more of the borrowers, and notify the daemon of the incident associated with the particular donor.

BRIEF DESCRIPTION OF THE DRAWINGS

The accompanying drawings, which are incorporated in and constitute a part of this specification, illustrate one or more embodiments described herein and, together with the description, explain these embodiments. In the drawings:

FIGS. 4A and 4B are diagrams of exemplary software components that may be implemented within the device of FIG. 2;

DETAILED DESCRIPTION

The following detailed description refers to the accompanying drawings. The same reference numbers in different drawings may identify the same or similar elements. Also, the following detailed description does not limit the invention. Instead, the scope of the invention is defined by the appended claims and equivalents.

Overview

Figure 1:
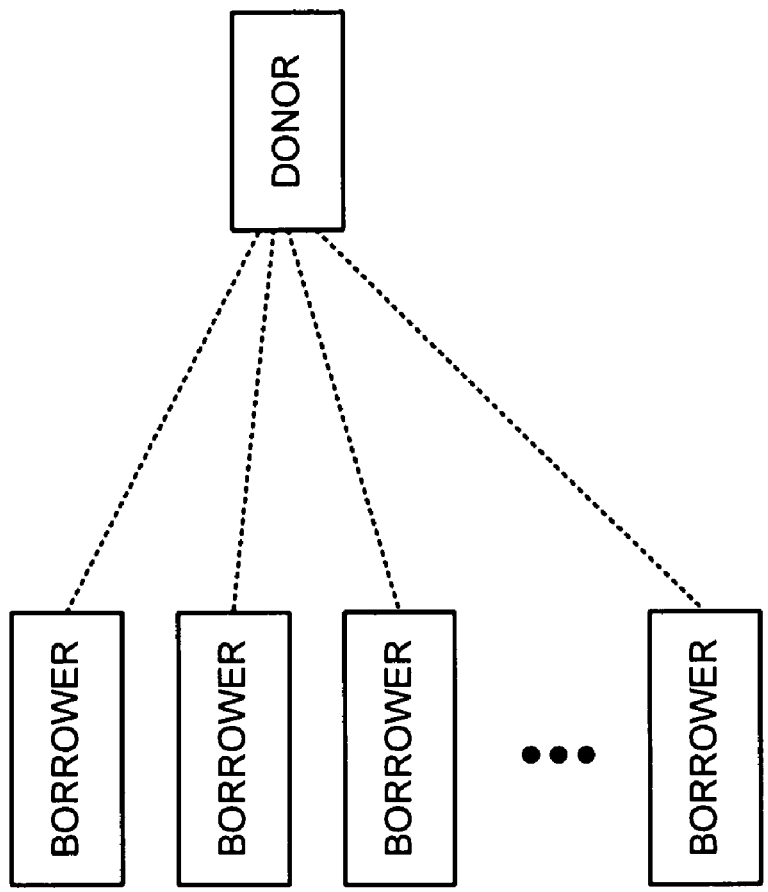
FIG. 1 is a diagram of an overview of concepts described herein.

FIG. 1 is a diagram of an overview of concepts described herein. As shown in FIG. 1, a donor may interact with a group of borrowers. A "donor," as described herein, may be interpreted as a logical or physical entity, such as an interface, that may maintain a pool of addresses. A "borrower," as described herein, may be interpreted as a logical or physical entity, such as an interface, that may borrow one or more addresses from the donor.

In one implementation, a borrower may correspond to an interface of a network device. The borrower may manage addresses for a group of subscribers (e.g., anywhere from a single subscriber to hundreds or thousands of subscribers). The borrower may obtain addresses, for the subscribers, from the donor.

In another implementation, a borrower may correspond to a plug-and-play interface, of a network device, to which an Internet Protocol (IP) address is not explicitly assigned, but rather obtains an IP address from another interface. For example, a borrower may obtain an IP address from the donor.

Sometimes incidents occur, at the donor, that require updates at one or more of the borrowers. For example, an incident may include an address change at the donor that may require an address change at one or more of the borrowers. Alternatively, or additionally, an incident may include a protocol change at the donor that may require a protocol change at one or more of the borrowers. Alternatively, or additionally, an incident may include the need for assignment of a new address to a borrower (e.g., a new subscriber joins, a new borrower is added, etc.) and this may require an address assignment or change at one or more of the borrowers. Alternatively, or additionally, an incident may include a flap at the donor (e.g., the donor goes up and down) that may require a change at one or more of the borrowers.

Systems and methods, described herein, may provide notifications regarding donor incidents in an efficient manner that is scalable and that can be implemented without cumbersome coding. While systems and methods will be described for providing notifications regarding donor incidents, these systems and method may operate in a similar manner to provide notifications regarding borrower incidents (e.g., a borrower leaves and, therefore, an address in the address pool, of a donor, is available again).

Exemplary Device

Figure 2:
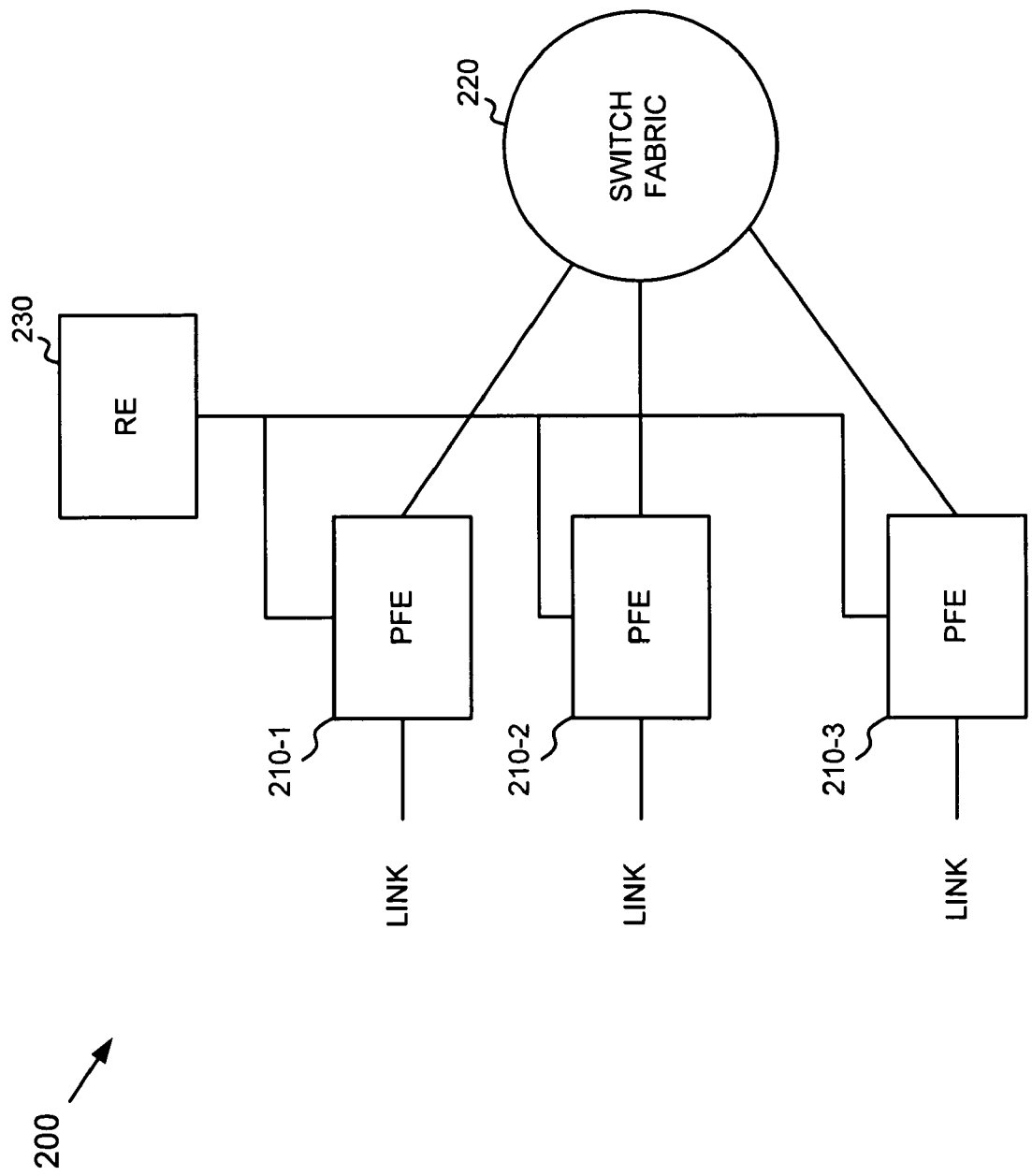
FIG. 2 is a diagram of an exemplary device in which systems and methods, described herein, may be implemented.

FIG. 2 is a diagram of an exemplary device 200 in which systems and methods, described herein, may be implemented. As shown in FIG. 2, device 200 may include packet forwarding engines (PFEs) 210-1, 210-2, and 210-3 (collectively referred to as PFEs 210, and individually as PFE 210), a switch fabric 220, and a routing engine (RE) 230. While FIG. 2 shows a particular number and arrangement of components within device 200, in other implementations, device 200 may include more, fewer, different, or differently arranged components. For example, device 200 may include more PFEs 210 and may include a control unit (not shown) that may perform security, quality of service, and/or accounting functions.

PFEs 210 may each connect to RE 230 and switch fabric 220. PFEs 210 may include hardware components, such as application specific integrated circuits (ASICs), field programmable gate arrays (FPGAs), a processor, or the like. PFEs 210 may receive packet data on physical links connected to a network, such as a wide area network (WAN) or a local area network (LAN). Each physical link could be one of many types of transport media, such as optical fiber or Ethernet cable. The data on the physical link may be formatted according to one of several protocols, such as the synchronous optical network (SONET) standard, an asynchronous transfer mode (ATM) technology, or Ethernet.

A PFE 210 may process incoming packet data prior to transmitting the data to another PFE 210 or to the network. PFE 210 may also perform a route lookup for the data using a forwarding table from RE 230 to determine destination information. If the destination indicates that the data should be sent out on a physical link connected to PFE 210, then PFE 210 may prepare the data for transmission by, for example, adding any necessary headers, and transmit the data from the port associated with the physical link. If the destination indicates that the data should be sent to another PFE 210 via switch fabric 220, then PFE 210 may prepare the data for transmission to the other PFE 210, if necessary, and send the data to the other PFE 210 via switch fabric 220.

Switch fabric 220 may include one or more switching planes to facilitate communication between two or more of PFEs 210. In one implementation, each of the switching planes may include a single or multi-stage switch of crossbar elements.

RE 230 may include a hardware component, such as an ASIC, a FPGA, a processor, or the like, that may perform high level management functions for device 200. For example, RE 230 may communicate with other networks and systems connected to device 200 to exchange information regarding network topology. RE 230 may create routing tables based on network topology information, create forwarding tables based on the routing tables, and forward the forwarding tables to PFEs 210. PFEs 210 may use the forwarding tables to perform route lookup for incoming packets. RE 230 may also perform other general control and monitoring functions for device 200.

Figure 3:
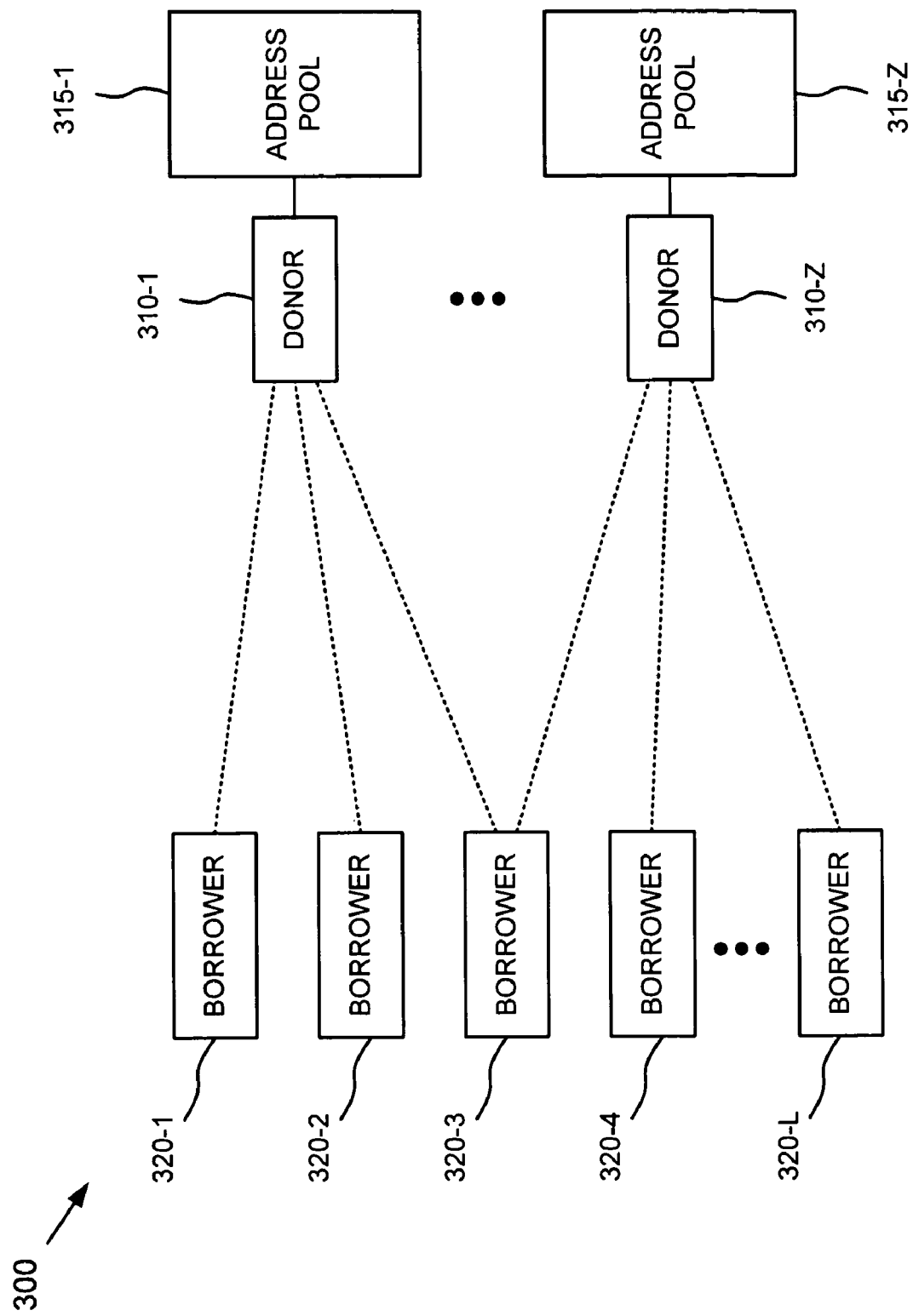
FIG. 3 is a diagram of exemplary functional components of at least a portion of the device of FIG. 2.

FIG. 3 is a diagram of exemplary functional components of at least a portion of device 200, shown as portion 300. As shown in FIG. 3, there might be one or more donors 310-1, . . . , 310-Z (collectively referred to as donors 310, and individually as donor 310) (where $Z \geq 1$), and one or more borrowers 320-1, . . . , 320-L (collectively referred to as borrowers 320, and individually as borrower 320) (where $L \geq 1$). Donor 310 may correspond to a logical or physical interface of device 200. Each of donors 310 may manage a pool of addresses 315-1, . . . , 315-Z (collectively referred to as pools of addresses 315, and individually as pool of addresses 315). Donor 310 may permit borrowers 320 to borrow addresses from pool of addresses 315.

Borrower 320 may correspond to a logical or physical interface of device 200. Each borrower 320 may borrow one or more addresses from a donor 310. Each borrower 320 may borrow addresses from multiple donors 310. The lines shown in FIG. 3 connecting borrowers 320 to donors 310 may identify the particular donor(s) 310 from which a particular borrower 420 borrows an address (e.g., borrower 320-1 borrows an address from donor 310-1).

Figure 4A:
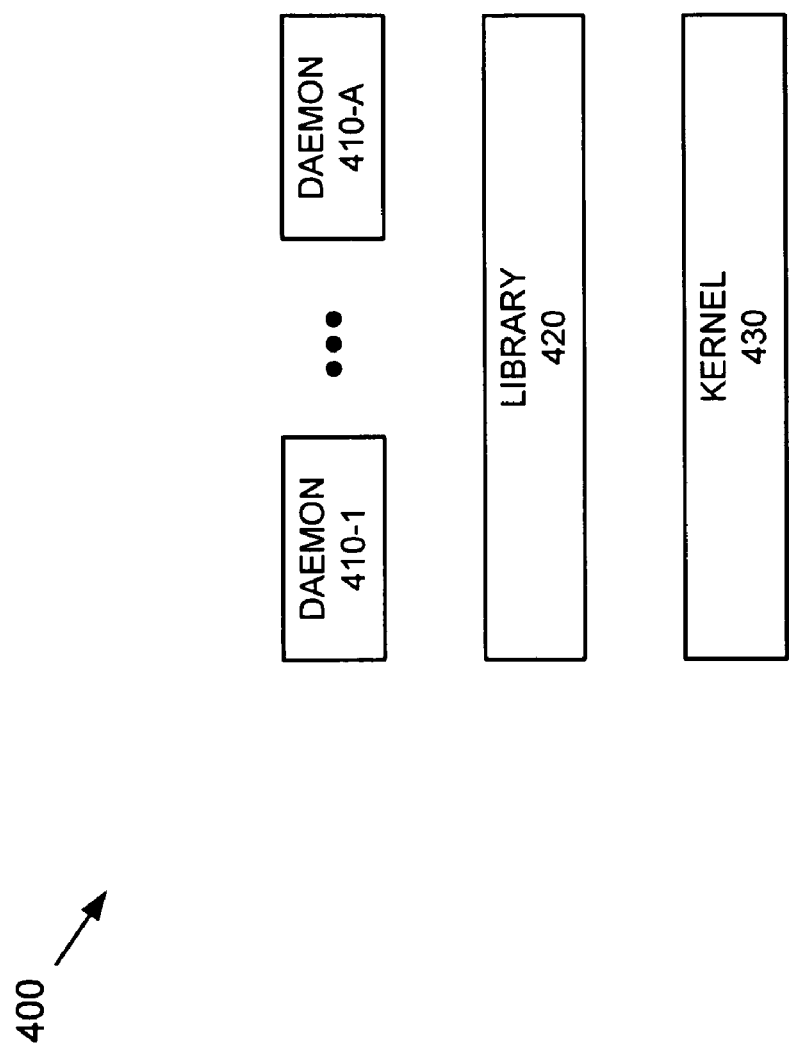

FIGS. 4A and 4B are diagrams of exemplary software components that may be implemented within device 200, shown as software collection 400. The exemplary software components shown in FIGS. 4A and 4B may be located within RE 230 and/or PFEs 210. In one implementation, the software components may all be located within RE 230. In another implementation, some of the software components are located within RE 230, and other ones of the software components are located within one or more of PFEs 210.

As shown in FIG. 4A, the exemplary software components of device 200 may include a number of daemons 410-1, . . . , 410-A (collectively referred to as daemons 410, and individually as daemon 410) (where $A \geq 1$) a library 420, and a kernel 430. Daemons 410 and kernel 430 may be located in separate address spaces. Each daemon 410 may be located in an address space that is separate from the address space of each other daemon 410. In the implementation shown in FIG. 4A, library 420 may be located in an address space separate from the address spaces of daemons 410 and kernel 430. In the implementation shown in FIG. 4B, each instance of library 420 may be located in the same address space as the corresponding daemon 410.

The term "daemon," as used herein, may refer to an application or program that may be operating on device 200. In one implementation, a daemon 410 may be an application or program that uses logical or physical interfaces associated with device 200. Generally, a daemon 410 may use a donor or a borrower. It may be possible for a daemon 410 to use both a donor and a borrower.

Library 420 may maintain certain information and perform certain functions for notifying daemons 410 of incidents on donors 310. Library 420 may be implemented as an entity separate from daemons 410, as shown in FIG. 4A. Alternatively, library 420 may be implemented as an entity integrated within daemons 410, as shown in FIG. 4B. In the implementation of FIG. 4B, library 420 may be compiled into each daemon 410.

Figure 5:
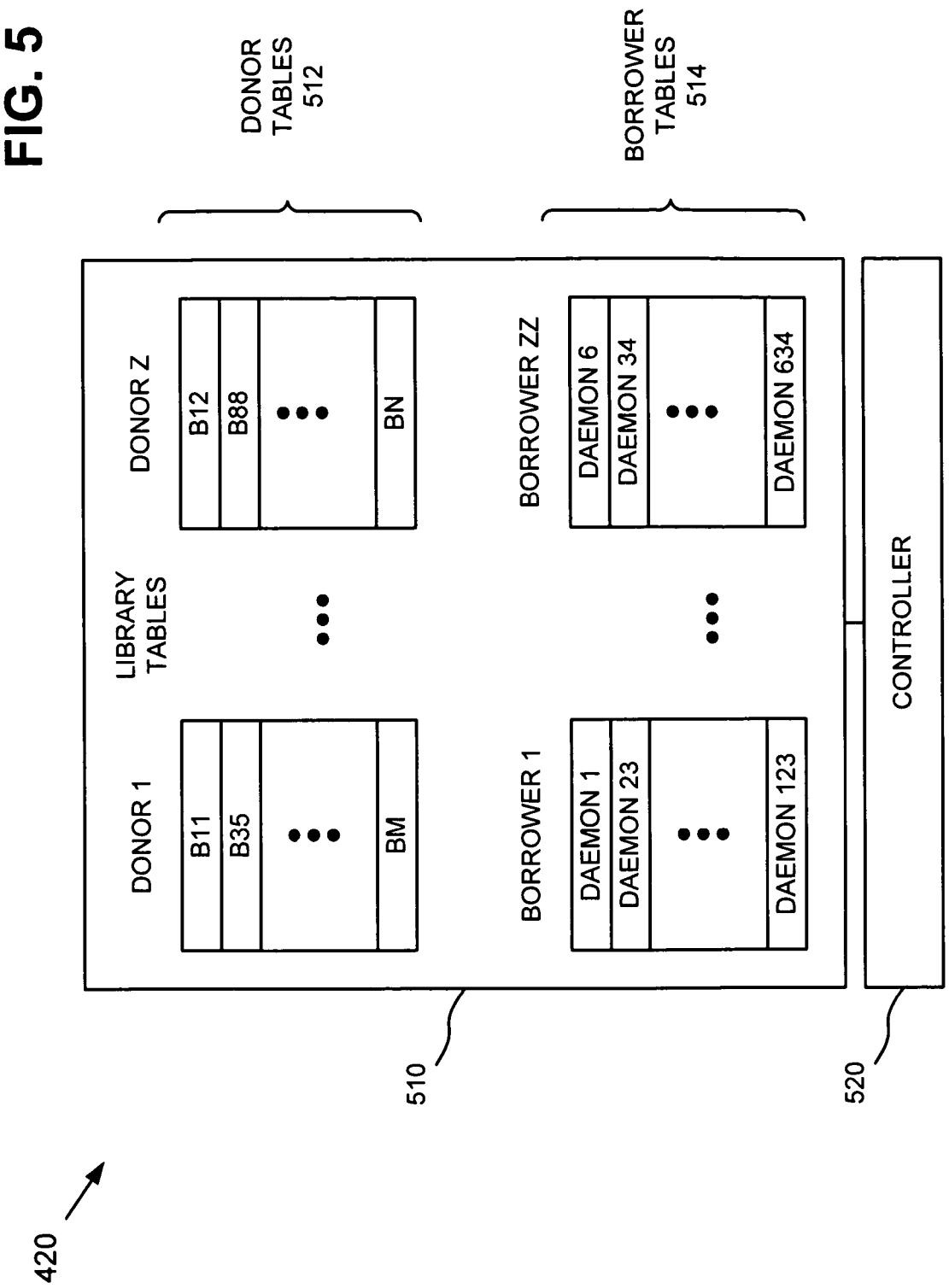
FIG. 5 is a diagram of exemplary functional components of the library of FIG. 4A or 4B.

FIG. 5 is a diagram of exemplary functional components of library 420. As shown in FIG. 5, library 420 may include library tables 510 and controller 520. The term "table," as used herein, may refer to any searchable form or arrangement of data within a memory.

Library tables 510 may include various tables that may be useful for mapping donors to borrowers and mapping borrowers to daemons interested in those borrowers. The particular tables 510 included in an instance of library 420 may vary and depend on whether library 420 is implemented as an entity separate from daemons 410 or as an entity integrated within daemons 410.

In one implementation, library tables 510 may include donor tables 512 and borrower tables 514. Donor tables 512 may include a separate table for each donor 310 (FIG. 3) from which at least one borrower has borrowed an address, and borrower tables 514 may include a separate table for each borrower 320 in which at least one daemon 410 (FIG. 4) has registered an interest. Each donor table 512 may list borrowers that have borrowed addresses from the corresponding donor 310. Each borrower table 514 may list daemons 410 that have registered an interest to be notified of incidents that concern the corresponding borrower 320.

In the implementation shown in FIG. 4B, library tables 510 may include a daemon table rather than borrower tables 514. The daemon table may list all of the borrowers 320 in which the corresponding daemon 410 is interested. This may facilitate the determination of whether the corresponding daemon 410 is interested in a borrower 320 that is affected by a donor incident.

Controller 520 may include hardware and/or software that may control the generation of library tables 510, communicate with kernel 430, provide notifications to daemons 410 of incidents involving donors 310, and/or provide notifications to daemons 410 of incidents affecting borrowers 320.

Returning to FIGS. 4A and 4B, kernel 430 may be a component of an operating system of device 200. Kernel 430 may manage the communication between hardware and software on device 200. In one implementation, kernel 430 may store information regarding which logical/physical interfaces are donors and which logical/physical interfaces are borrowers, and may store information regarding which borrowers have borrowed addresses from which donors. When a donor incident occurs, kernel 430 may be notified by the donor or by a hardware (or software) component of device 200 (e.g., a component within PFE 210, switch fabric 220, or RE 230). When kernel 430 is notified of a donor incident, kernel 430 may notify library 420 (e.g., controller 520 (FIG. 5)) that a donor incident has occurred and identify the donor that was involved in the incident.

Process for Populating Library

Figure 6:
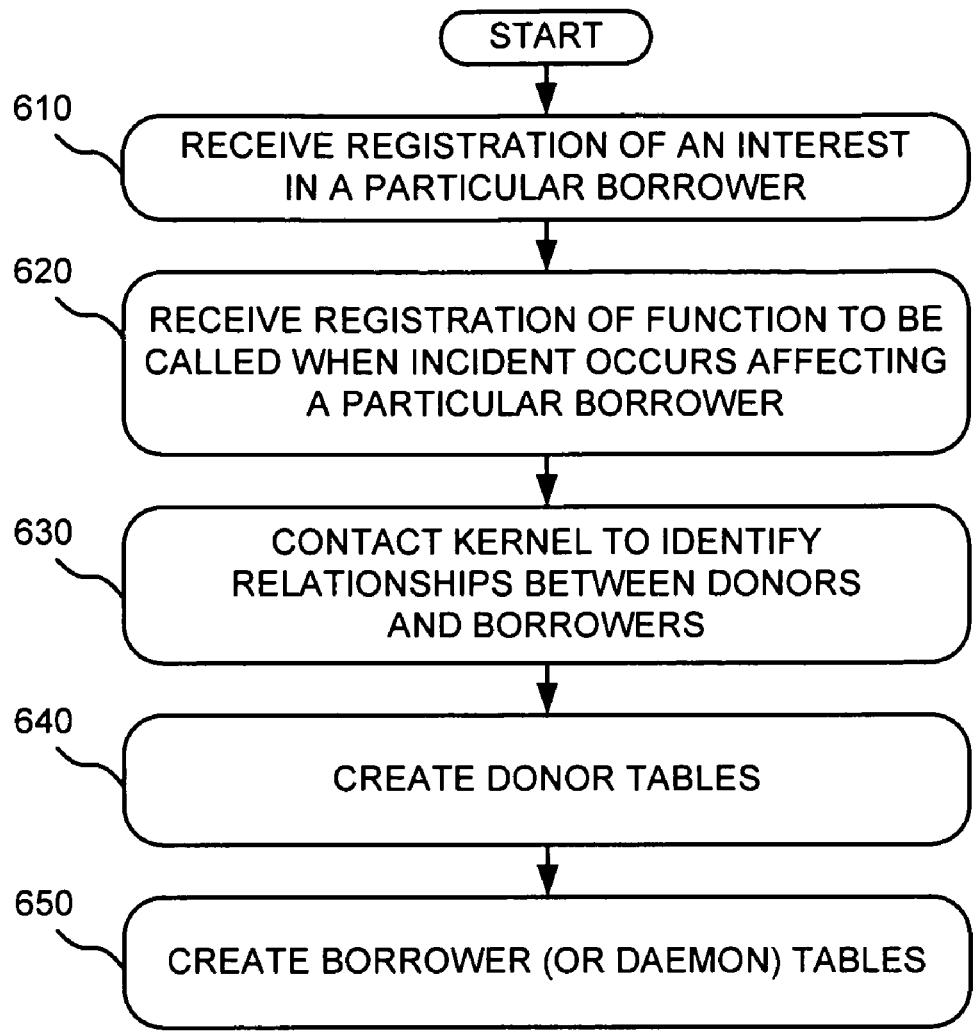
FIG. 6 is a flowchart illustrating an exemplary process for populating the library of FIG. 4A or 4B.

FIG. 6 is a flowchart illustrating an exemplary process for populating library 420. The process of FIG. 6 may be performed by controller 520, or hardware and/or software operating in conjunction with library 420. The process of FIG. 6 may begin with receipt of a registration request identifying an interest in a particular borrower (block 610). For example, a daemon 410 may send a registration request to library 420. The registration request may include various information.

For example, the registration request may include information uniquely identifying a particular borrower in which daemon 410 has registered an interest, or no further interest, to be notified when an incident occurs that affects the particular borrower. The registration request may also include information indicating whether daemon 410 is registering or unregistering an interest in the particular borrower. Daemon 410 may register an interest when daemon 410 is interested in being notified about an incident affecting the particular borrower, and may unregister an interest when daemon 410 is no longer interested in being notified about incidents affecting the particular borrower. The registration request may also include an argument that may, for example, include a pointer to a memory location that contains a set of parameters that daemon 410 wants to receive when notified about an incident affecting the particular borrower.

A registration request, with a function to be called when an incident occurs affecting a particular borrower, may be received (block 620). For example, daemon 410 may send a registration request to library 430. The function included in the registration request may vary from daemon to daemon. The registration request may indicate, to library 430, that when an incident occurs affecting the particular borrower, library 430 should call the function included in the registration request.

Kernel 430 may be contacted to identify relationships between donors 310 and borrowers 320 (block 630). For example, controller 520 (FIG. 5) may send one or more queries to kernel 430 to identify the donor that is associated with each of the registered borrowers. As explained above, kernel 430 stores information that identifies which logical/physical interfaces are donors 310, which logical/physical interfaces are borrowers 320, and which borrowers 320 have borrowed addresses from which donors 310.

Donor tables 512 may be created (block 640). For example, controller 520 may use the information obtained from kernel 430 to identify mappings between donors and borrowers. Controller 520 may create tables 512 that store these mappings. In one implementation, controller 520 may create a separate table for each donor 310. Each of these donor tables 512 may identify borrowers 320 that are associated with the corresponding donor 310 (e.g., borrowers 320 that have borrowed addresses from this donor 310).

Borrower tables 514 may be created (block 650). For example, controller 520 may use the received registration requests to identify mappings between daemons 410 and borrowers 320. These mappings may identify the particular borrowers 320 in which daemons 410 are interested. Controller 520 may create tables 514 that store these mappings. In one implementation, controller 520 may create a separate table for each borrower 320. Each of these borrower tables 514 may identify daemons 410 that have registered an interest in the corresponding borrower 320 (e.g., daemons 410 that have sent a registration request for this borrower 320). Borrower tables 514 may be created based on registration requests from a number of daemons 410.

In an alternative implementation, daemon tables may be created rather than borrower tables (block 650). Like the borrower tables, the daemon tables may identify mappings between daemons 410 and borrowers 320. Unlike the borrower tables, a daemon table may list the borrowers in which a particular daemon 410 is interested. In one implementation, controller 520 may create a separate table for each daemon 410, or for just that daemon 410 with which controller 520 is associated (e.g., see FIG. 4B).

Exemplary Process for Updating Daemons

Figure 7:
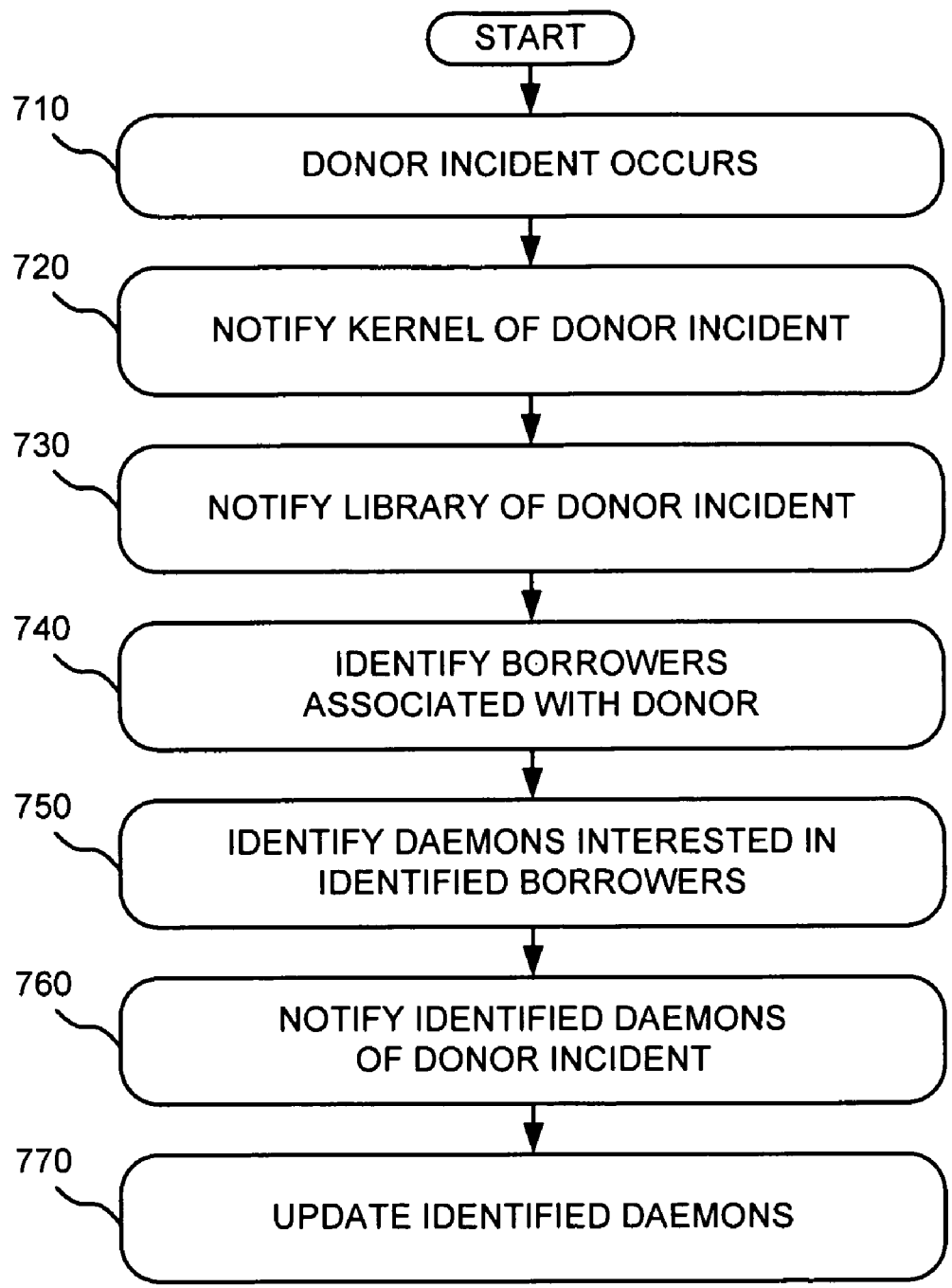
FIG. 7 is a flowchart illustrating an exemplary process for updating daemons in response to a donor incident.

FIG. 7 is a flowchart illustrating an exemplary process for updating daemons 410 in response to a donor incident. The process of FIG. 7 may be performed by daemons 410, library 420, and/or kernel 430, or hardware and/or software operating in conjunction with daemons 410, library 420, and/or kernel 430. The process of FIG. 7 may begin with a donor incident occurring (block 710). As explained above, a donor incident can take different forms, such as an address change, a protocol change, the joining of a new subscriber, and/or a donor flap.

Kernel 430 may be notified of the donor incident (block 720). Kernel 430 may manage the communication between hardware and software on device 200. Accordingly, when a change occurs on a logical or physical interface, kernel 430 may be notified of this change. The notification to kernel 430 may uniquely identify the donor 310 involved in the incident.

Library 420 may be notified of the donor incident (block 730). Kernel 420 may make a call, such as a remote procedure call or a remote method invocation, or pass a message to library 420 to inform library 420 that a donor incident occurred and which donor 310 was involved in the incident. Communication that traverses from the address space of kernel 430 to the address space(s) of library 420 or daemons 410, and vice versa, may reduce system performance and responsiveness. In the implementation shown in FIG. 4A, kernel 430 may send only a single notification to library 420 to inform library 420 of the donor incident. In the implementation shown in FIG. 4B, kernel 430 may send a separate notification to library 420 of each daemon 410 to inform library 420 of the donor incident. System performance and responsiveness may differ between the implementation of FIG. 4A in which the kernel sends a single notification and the implementation of FIG. 4B in which the kernel sends multiple notifications to each daemon in response to a single donor incident that affects numerous borrowers.

Borrowers 320 that are associated with donor 310 may be identified (block 740). For example, controller 520 (of library 420) may access one of donor tables 512 that corresponds to donor 310. From this donor table 512, controller 520 may identify borrowers 320 that have borrowed addresses from donor 310.

Daemons 410, which have registered an interest in the identified borrowers 320, may be identified (block 750). For example, controller 520 may access borrower tables 514 corresponding to the identified borrowers 320 (or a daemon table corresponding to a particular daemon 410). From these borrower tables 514 (or the daemon table), controller 520 may identify daemons 410 that have registered an interest in the borrowers 320 by, for example, sending a registration request, as explained above.

The identified daemons 410 may be notified of the donor incident (block 760). For example, controller 520 may generate a notification for a particular daemon 410 by calling the function that the particular daemon 410 registered with library 420. Controller 520 may indicate to the particular daemon 410 what donor 310 was involved and identify the incident that occurred. Controller 520 may also provide to the particular daemon 410 the set of parameters that the particular daemon 410 previously identified to library 420 in a prior registration request.

The identified daemons 410 may be updated (block 770). For example, the identified daemons 410 may receive the notifications regarding the donor incident, and may perform an update, accordingly. The update may include, for example, changing an address associated with one of its borrowers, changing a protocol associated with one of its borrowers, and/or assigning an address to one of its borrowers.

Example

Figure 8:
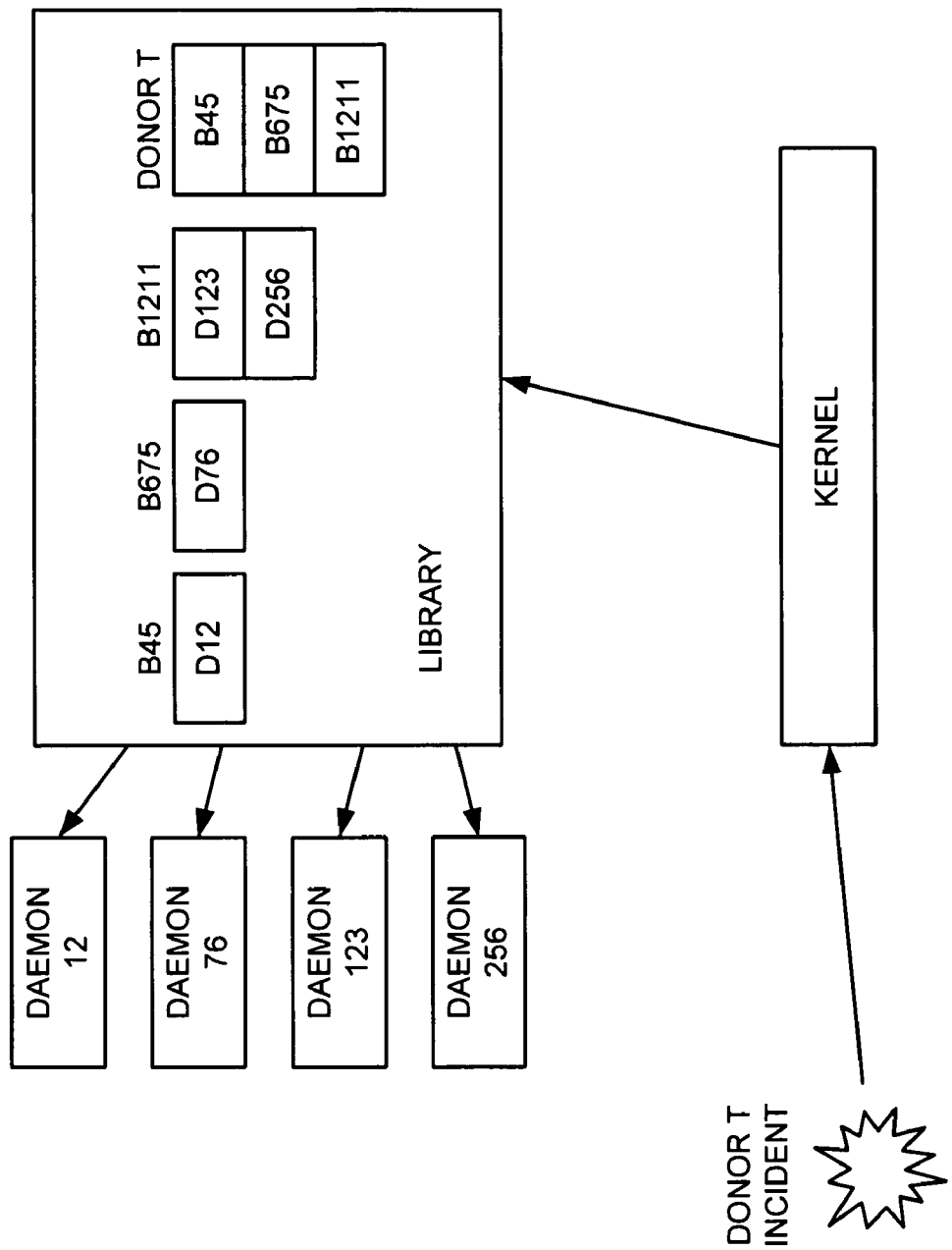
FIG. 8 is a diagram illustrating an example of notifying daemons in response to a donor incident.

FIG. 8 is a diagram illustrating an example of notifying daemons in response to a donor incident. As shown in FIG. 8, assume that a donor incident occurs that involves donor T. The kernel may be notified of the donor T incident. The kernel may transmit a notification to the library. This notification may include a notification that crosses over from the address space of the kernel to the address space of the library.

The library may receive the notification and determine which borrowers are affected by the donor incident. The library may access a donor T table to identify the borrowers that have borrowed addresses from donor T. As shown in FIG. 8, the donor T table may include information regarding three borrowers, shown as B45, B675, and B1211.

The library may access borrower tables corresponding to these three borrowers to identify daemons that are interested in these borrowers. As shown in FIG. 8, the library may include a borrower B45 table that includes information regarding a daemon D12, a borrower B675 table that includes information regarding a daemon D76, and a borrower B1211 table that includes information regarding a daemon D123 and a daemon D256. The library may notify daemons D12, D76, D123, and D256 of the donor T incident.

Figure 9:
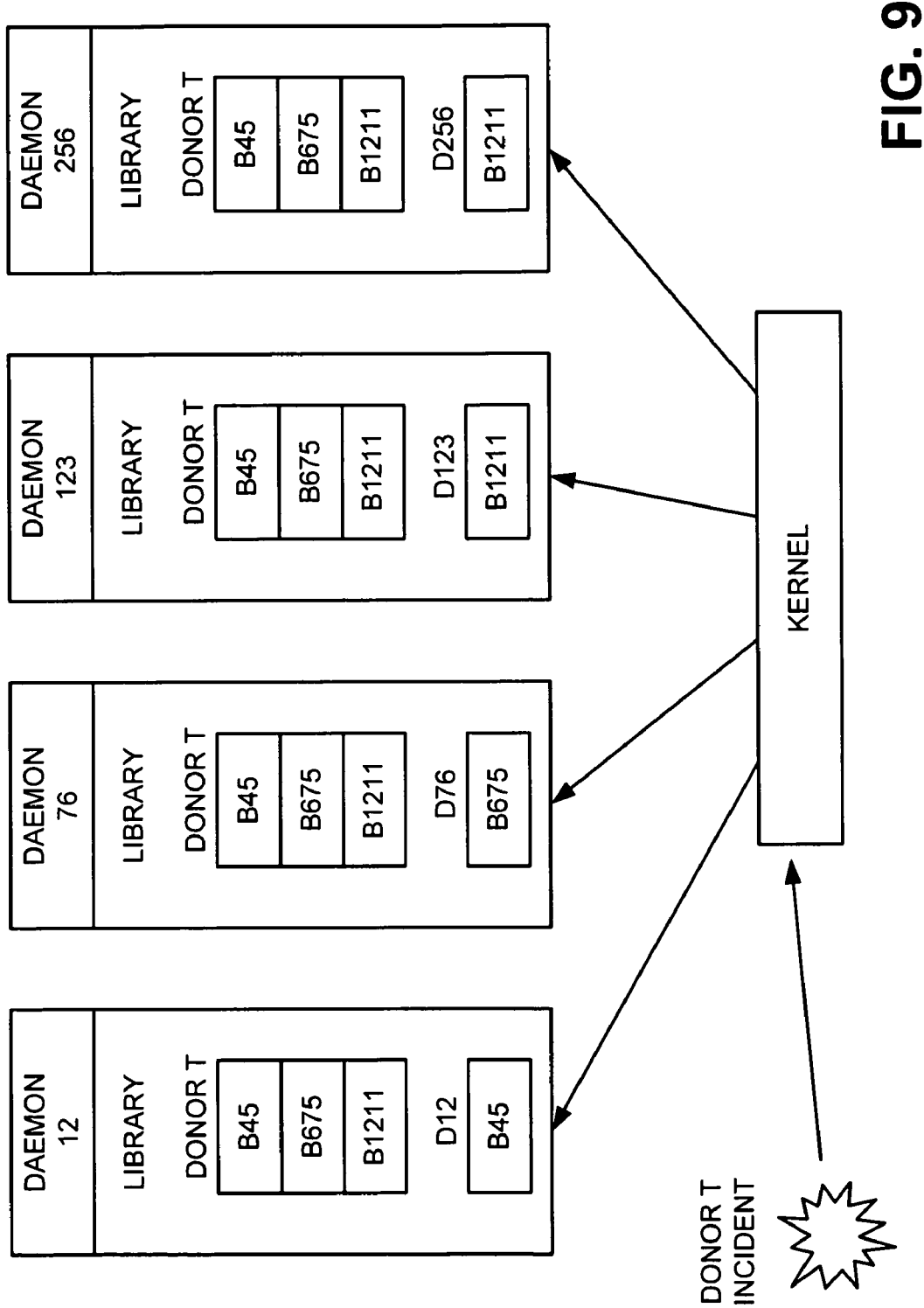
FIG. 9 is a diagram illustrating another example of notifying daemons in response to a donor incident.

FIG. 9 is a diagram illustrating another example of notifying daemons in response to a donor incident. As shown in FIG. 9, assume that a donor incident occurs that involves donor T. The kernel may be notified of the donor T incident. The kernel may transmit notifications to the libraries associated with each daemon. These notifications may include notifications that cross over from the address space of the kernel to the address space of the daemons.

Each library may receive its notification and determine which borrowers are affected by the donor incident. Each library may access a donor T table to identify the borrowers that have borrowed addresses from donor T. As shown in FIG. 9, the donor T table may include information regarding three borrowers, shown as B45, B675, and B1211.

Each library may access a daemon table to determine whether the corresponding daemon is interested in any of these borrowers. As shown in FIG. 9, the library associated with daemon 12, for example, may include a daemon D12 table that includes information regarding the borrowers in which daemon 12 is interested. The library may notify its associated daemon D12, D76, D123, or D256 of the donor T incident.

In an alternative implementation, each library may include borrower tables, such as the borrower tables shown in FIG. 8. In this case, the relevant borrower tables may be searched to determine whether any of the relevant borrower tables identify the corresponding daemon.

CONCLUSION

Implementations described herein may efficiently notify daemons of donor incidents that affect borrowers in which the daemons are interested. While the description focused on donor incidents and the impact on borrowers, the description also applies to borrower incidents and the impact on donors. For example, an incident may occur on a borrower (e.g., a borrower may leave) and a daemon, that has registered an interest in a donor from which the borrower borrowed an address, may be notified of the incident (e.g., so that the donor can make the address(es) associated with the borrower available in the address pool).

The implementations described herein may reduce the number of context switches between the kernel address space and the address space(s) of the library and/or daemons. This may make the notification process scalable in the sense that increases in the number of notifications can be performed efficiently by the library outside of the kernel address space. This may also decrease processing time and memory requirements of the kernel. Also, notifying only those daemons that have registered an interest in borrowers affected by a donor incident may increase system performance.

The implementations described herein may increase system performance and decrease coding complexity by mapping, within the library, donors to borrowers and borrowers to only those daemons that have registered an interest in the borrowers. As a result, the individual daemons do not have to track this information themselves. Rather, daemons are presented with notifications only concerning those borrowers in which they are interested. Also, the daemons can treat the borrowers as regular interfaces rather than treating them as special interfaces.

The foregoing description provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 6 and 7, the order of the blocks may be modified in other implementations. Further, non-dependent blocks may be performed in parallel.

Also, certain portions of the implementations have been described as "components" that perform one or more functions. The term "component" may include hardware, such as a processor, an ASIC, or a FPGA, software, or a combination of hardware and software (e.g., software running on a general purpose processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A device, comprising:
a non-transitory storage medium; and
a controller, coupled to the non-transitory storage medium, the controller being to:
register, based on receiving a first registration request from each of a plurality of daemons, an interest in a borrower identified in each of the registration requests,
identify, based on registering the interests, a first relationship between a donor and the borrower,
the first relationship identifying that the borrower has selectively obtained an address, of a pool of addresses, maintained by the donor,
the pool of addresses being associated with one or more interfaces that are associated with the donor,
store, in the non-transitory storage medium, information identifying the first relationship and information identifying a plurality of second relationships between each of the plurality of daemons and the borrower,
receive a second registration request from one of the plurality of daemons, the second registration request identifying a function to be called when the controller notifies the one of the plurality of daemons of an occurrence of an incident that affects the borrower,
modify the information identifying the plurality of second relationships based on the second request,
receive a notification corresponding to an occurrence of an incident associated with the donor,
identify, after receiving the notification, the borrower based on the first relationship,
determine, based on maintaining the plurality of second relationships, that each of the plurality of daemons have registered the interest in the borrower, and
output, to each of the plurality of daemons and based on the registration of the interest, a second notification to notify each of the plurality of daemons of the incident associated with the donor, the controller calling the function when notifying the one of the plurality of daemons of the incident.

2. The device of claim 1, where the controller identifies the first relationship based on determining that the borrower obtains a plurality of addresses from the donor.

3. The device of claim 1, further comprising:
a plurality of donors, the plurality of donors including the donor, each of the plurality of donors maintaining a respective pool of addresses; and
a plurality of borrowers, the plurality of borrowers including the borrower, where each of the plurality of borrowers selectively obtains one or more addresses from one or more of the plurality of donors, and
where the non-transitory storage medium includes:
a plurality of donor tables, each of the donor tables mapping a particular one of the plurality of donors to one or more of the plurality of borrowers, and where the controller is to identify the first relationship based on one of the plurality of donor tables.

4. The device of claim 3, where the controller is further to:
receive information regarding the plurality of donors and the plurality of borrowers, and
based on the information regarding the plurality of donors and the plurality of borrowers, at least one of:
create a first donor table, of the plurality of donor tables, or
modify the first donor table.

5. The device of claim 1, where the non-transitory storage medium includes:
a data structure that maps the borrower to each of the plurality of daemons, and
where the controller is to:
store the information identifying the plurality of second relationships in the data structure, and
identify the borrower based on the data structure.

6. The device of claim 5, where the registration request from each of the plurality of daemons indicates that each of the plurality of daemons is interested in being notified when the incident occurs that affects the borrower, and
where, based on receiving the registration request from each of the plurality of daemons, the controller is to at least one of:
create the data structure, or
modify the data structure.

7. The device of claim 5, where the controller is further to:
receive a third registration request from another one of the plurality of daemons, the other registration request indicating that the other one of the plurality of daemons is no longer interested in being notified when the incident occurs that affects the borrower, and
where the controller is to modify the data structure based on the third registration request.

8. The device of claim 1, where the controller is to receive the notification regarding the incident associated with the donor from a kernel that is located in a different address space from an address space in which the controller or the plurality of daemons are located.

9. The device of claim 1, where the non-transitory storage medium includes:
a daemon table that maps each of the plurality of daemons to the borrower.

10. The device of claim 1, where the incident includes an address change or a protocol change associated with the interface.

11. A method, comprising:
storing, by a controller, implemented at least partially in hardware, of a network device, information identifying first mappings between a plurality of donors and a plurality of borrowers that have obtained addresses from the plurality of donors;
storing, by the controller, information identifying second mappings between a plurality of daemons and one of the plurality of borrowers, the plurality of daemons having registered an interest in the one of the plurality of borrowers;
receiving, by the controller, a registration request from one of the plurality of daemons, the registration request identifying a function to be called when the controller notifies the one of the plurality of daemons of an occurrence of an incident that affects the one of the plurality of borrowers;
modifying, by the controller, the information identifying the second mappings based on the registration request;
receiving, by the controller, a first notification regarding an incident associated with one of the plurality of donors associated with the one of the plurality of borrowers;
identifying, by the controller, the one of the plurality of borrowers based on the information identifying the first mappings;
identifying, by the controller, the plurality of daemons that have registered an interest in the one of the plurality of borrowers based on the information identifying the second mappings; and
sending, by the controller and only to each of the plurality of daemons, a second notification regarding the incident associated with the one of the plurality of donors, the sending including calling the function when sending the second notification to the one of the plurality of daemons.

12. The method of claim 11, where storing the first mappings includes creating a plurality of donor tables, each of the plurality of donor tables mapping a particular one of the plurality of donors to at least one of the plurality of borrowers.

13. The method of claim 12, further comprising:
receiving information regarding the plurality of donors and the plurality of borrowers, and
where creating the plurality of donor tables includes at least one of:
creating one of the plurality of donor tables based on the information regarding the plurality of donors and the plurality of borrowers, or
modifying one of the plurality of donor tables based on the information regarding the plurality of donors and the plurality of borrowers.

14. The method of claim 11, where storing the second mappings includes creating a plurality of borrower tables, one of the plurality of borrower tables mapping the one of the plurality of borrowers to the plurality of daemons.

15. The method of claim 14, where creating the plurality of borrower tables includes:
receiving a second registration request from the one of the plurality of daemons, the second registration request indicating that the one of the plurality of daemons is interested in being notified when the incident occurs that affects the one of the plurality of borrowers, and
modifying the one of the plurality of borrower tables based on the second registration request.

16. The method of claim 14, where creating the plurality of borrower tables includes:
receiving a second registration request from the one of the plurality of daemons, the second registration request indicating that the one of the plurality of daemons is no longer interested in being notified when the incident occurs that affects the one of the plurality of borrowers, and
modifying the one of the borrower tables, based on the second registration request.

17. The method of claim 11, where storing the second mappings includes creating a plurality of daemon tables, each daemon table, of the plurality of daemon tables, mapping a particular one of the plurality of daemons to the one of the plurality of borrowers.

18. A system comprising:
one or more devices that comprise a controller coupled to a non-transitory storage medium, the one or more devices being to:
store information identifying first mappings between a plurality of donors and a plurality of borrowers that have obtained addresses from the plurality of donors, store information identifying second mappings between a plurality of daemons that have registered an interest in borrowers of the plurality of borrowers, receive a registration request from a daemon, of the plurality of daemons, the registration request identifying a function to be called when the one or more devices notify the daemon of an occurrence of an incident that affects one of the plurality of borrowers, modify the information identifying the second mappings based on the registration request, receive a first notification regarding an incident associated with one of the plurality of donors, identify, based on the information identifying the first mappings, the one of the plurality of borrowers, the one of the plurality of borrowers having obtained an address, associated with an interface of one of the one or more devices, from the one of the plurality of donors, identify, based on the information identifying the second mappings, two or more of the plurality of daemons that have registered an interest in the one of the plurality of borrowers, the two or more of the plurality of daemons including the daemon, and transmit, to each of the identified two or more of the plurality of daemons, a second notification to notify the identified two or more of the plurality of daemons of the incident associated with the one of the plurality of donors, the one or more devices calling the function based on transmitting the second notification to the daemon.

19. The device of claim 18, where the incident includes an address change or a protocol change associated with the interface.

20. A device, comprising:
a plurality of daemons;
a plurality of donors;
a plurality of borrowers that obtain addresses from the plurality of donors;
a kernel to output a notification regarding an incident involving a particular donor of the plurality of donors; and
a controller, coupled to a non-transitory storage medium, to:
store information identifying first mappings between the plurality of donors and the plurality of borrowers,
store information identifying second mappings between the plurality of daemons that have registered an interest in one or more of the plurality of borrowers,
receive a registration request from a daemon, of the plurality of daemons, the registration request identifying a function to be called when the controller notifies the daemon of an occurrence of the incident involving the particular donor,
modify the information identifying the second mappings based on the registration request,
receive, from the kernel, the notification regarding the incident involving the particular donor,
identify, based on the information identifying the first mappings, one or more of the plurality of borrowers that have obtained addresses from the particular donor,
determine that each of the plurality of daemons have registered an interest in a particular borrower of the one or more of the plurality of borrowers, and
notify each of the plurality of daemons of the incident associated with the particular donor, the controller calling the function identified in the registration when notifying the daemon.

21. The device of claim 20, where the controller is integrated within one of the plurality of daemons.

22. The device of claim 20, where, prior to notifying the plurality of daemons, the controller is to receive a second registration request from one of the plurality of daemons, the registration request indicating that the one of the plurality of daemons is interested in being notified when an incident occurs that affects the particular borrower.

23. The device of claim 20, where the controller is further to:
receive a second registration request from another daemon, of the plurality of daemons, the second registration request indicating that the other daemon is no longer interested in being notified when an incident occurs that affects the particular borrower, and
modify the information identifying the second mappings based on the second registration request.

* * * * *